(12) United States Patent
Charmes et al.

(10) Patent No.: US 6,431,857 B1
(45) Date of Patent: Aug. 13, 2002

(54) CATALYTIC COMBUSTION DEVICE EMITTING INFRARED RADIATION

(75) Inventors: Michel Charmes, St. Didier Au Mont d'Or; Eric Rogemond, Satolas & Bonce, both of (FR)

(73) Assignee: Sunkiss, Sathonay Camp (FR)

( * ) Notice: Subject to any disclaimer, the term of this patent is extended or adjusted under 35 U.S.C. 154(b) by 0 days.

(21) Appl. No.: 09/507,917

(22) Filed: Feb. 22, 2000

(30) Foreign Application Priority Data

Mar. 25, 1999 (FR) .............................................. 99 03905

(51) Int. Cl.[7] ......................... F23D 14/14; F23D 14/16; F23D 14/18; F23D 14/82
(52) U.S. Cl. ............................. 431/328; 431/326; 431/7
(58) Field of Search ................................. 431/326, 328, 431/329, 7, 170, 11, 207; 126/92 R, 92 AC, 92 B

(56) References Cited

U.S. PATENT DOCUMENTS

| 3,155,142 A | 11/1964 | Stack |
| 3,291,187 A | 12/1966 | Haensel |
| 4,421,476 A | * 12/1983 | Gulden et al. ............... 431/328 |

FOREIGN PATENT DOCUMENTS

| DE | 1 401 165 | | 10/1968 | | |
| EP | 351082 | * | 1/1990 | ................. | 431/326 |
| GB | 2 096 483 A | | 10/1982 | | |
| JP | A-58-69312 | | 4/1983 | | |
| JP | A-58-140511 | | 8/1983 | | |
| JP | 59-56019 A | * | 3/1984 | ................. | 431/328 |
| JP | A-59-56019 | | 3/1984 | | |
| JP | 0153017 | * | 8/1984 | ................. | 431/328 |
| JP | 59-176509 A | * | 10/1984 | ................. | 431/328 |
| JP | A-59-225211 | | 12/1984 | | |
| JP | 60-53711 A | * | 3/1985 | ..................... | 431/7 |
| JP | 223909 | * | 11/1985 | ................. | 431/326 |
| JP | 61-122416 A | * | 6/1986 | ..................... | 431/7 |
| WO | WO 93/18342 | * | 9/1993 | ................. | 431/114 |

* cited by examiner

*Primary Examiner*—Carl D. Price
(74) *Attorney, Agent, or Firm*—Oliff & Berridge, PLC

(57) ABSTRACT

Device (1) for the surface emission of infrared radiation, comprising a combustion chamber (2) having a wall (3) made of refractory material, permeable through its thickness, suitable for the passage of a mixture (4) to be burnt (combustible gas (30) plus oxidizer gas (31), for example air) from its upstream face (3a) to its downstream face (3b), and the internal developed surface of which is coated with a catalytic combustion material, and an upstream chamber (5) supplied on one side with the mixture to be burnt and closed on the other side by the catalytic combustion wall. The combustion chamber (2) includes at least one heat exchange wall (6), placed upstream of and facing the catalytic wall (3), in order to receive via its downstream face (6b) at least most of the heat radiated by the upstream face (3a) of said catalytic combustion wall, said heat exchange wall made of refractory material also being permeable through its thickness and suitable for passage of the mixture (4) to be burnt.

This device may be applied in any suitable equipment, especially for drying paint.

15 Claims, 3 Drawing Sheets

CATALYTIC COMBUSTION DEVICE EMITTING INFRARED RADIATION

BACKGROUND OF THE INVENTION

The present invention relates to a device for the surface emission of infrared radiation, with catalytic combustion of a mixture of a combustible gas (a gaseous hydrocarbon such as butane or natural gas) with an oxidizer gas, for example air, which may or may not be overpressurized or compressed.

Such a device may be used by itself, or grouped or joined together with other devices, for example a drying oven or tunnel, or in various applications, for example drying, curing of a coating, etc.

The term "surface emission" should be understood to mean a surface emitting, at every point, infrared radiation, of between 2 $\mu$m and 10 $\mu$m, with a calorific emission power distributed homogeneously and uniformly over the entire emitting surface. Preferably, this surface is plane, for example with a polygonal outline, especially rectangular. However, such a surface may be convex or concave.

According to document U.S. Pat. No. 3,291,187, a device for the surface emission of infrared radiation is already known, this comprising a combustion chamber having a catalytic combustion wall, with a certain thickness, made of refractory material, permeable through its thickness, and suitable, for example in terms of pressure drop, for the passage of a mixture to be burnt. The latter, as in any burner, consists of a mixture of a combustible gas, for example a gaseous hydrocarbon, such as butane or natural gas, and an oxidizer gas, for example atmospheric air, and said mixture may or may not be compressed. A diffuser for the mixture to be burnt is optionally placed upstream of the heat exchange wall, so as to homogenize the mixture to be burnt before it reaches the upstream face of said catalytic combustion wall. The mixture to be burnt passes from the upstream face to the downstream face of the catalytic combustion wall, the internal developed surface of which is coated with a catalytic combustion material, for example one or more metals or metal oxides having the property of catalyzing the oxidation of hydrocarbons, for example platinum and/or palladium. This catalytic combustion chamber includes an upstream chamber in which the diffuser, supplied on one side with the mixture to be burnt and closed on the other side by the catalytic combustion wall, is optionally placed.

SUMMARY OF THE INVENTION

For devices as described above, in which the surface area for infrared emission, corresponding to the downstream face of the catalytic combustion wall, is relatively large, two difficulties are encountered in practice.

The first relates to controlling the calorific power emitted by the catalytic combustion wall, by varying the pressure of the combustible gas. In practice, for a minimum pressure of said gas, corresponding to a minimum emitted power, if the pressure drop caused by the mixture to be burnt passing through the catalytic combustion wall is too low, the developed internal surface of this same wall cools too quickly, which, in certain cases, results in deactivation of the catalytic material. In such cases, it is then necessary to re-ignite the catalytic combustion in order to return the catalytic combustion wall to its rated emission power.

The second difficulty relates to keeping the temperature at all points on the surface emitting infrared radiation high enough to keep the catalytic material activated, and thus to obtain catalytic combustion uniformly distributed over the entire aforementioned surface without a "dead zone", that is to say a zone which is inactive in terms of combustion.

The object of the present invention is to remedy the aforementioned drawbacks.

More specifically, the subject of the invention is a solution particularly (but not exclusively) designed for devices having a relatively large surface area emitting infrared radiation, making it possible to limit or prevent inactivation of the catalytic material, on the one hand locally, and on the other hand when the device operates at its minimum power, when the latter is controlled or regulated.

According to the present invention, the combustion chamber includes at least one heat exchanger, placed upstream of and transversely with respect to the catalytic combustion wall. This heat exchanger is made of a refractory material, for example a ceramic, and is permeable, like the catalytic combustion wall, through its thickness, by being suitable, for example in terms of pressure drop, for passage of the mixture to be burnt. This heat exchanger forms with the catalytic combustion wall an intermediate gap, separated by the heat exchanger from the rest of the device or the upstream chamber. This heat exchanger receives, via its downstream face, directly facing the catalytic combustion wall, mainly by radiation, at least most of the heat radiated by the upstream face of the catalytic combustion wall.

Preferably, the combustion chamber includes a diffuser for the mixture to be burnt, placed, for example, in the upstream chamber, upstream of the heat exchanger.

According to the present invention, the term "heat exchanger" should therefore be understood to mean an element as defined above, in which no catalytic combustion takes place and which can, according to the embodiment adopted, be likened to a permeable wall having a certain thickness, through which the mixture to be burnt passes over its entire working cross section. The first function of this exchanger is to absorb at least some of the heat emitted by the upstream face of the catalytic combustion wall and to deliver it, at least partly, to the mixture to be burnt which is passing through it, immediately before it reaches the upstream face of the catalytic combustion wall.

In order for heat exchange to be effective, the heat exchanger in question is dimensioned in terms of thickness (that is to say of length in the direction of flow of the mixture to be burnt) so that the residence time within said exchanger of the mixture to be burnt is at least 0.1 s. If the thickness of the heat exchanger is too low, to the point that the residence time of the mixture to be burnt is less than 0.1 s, there is, firstly, overheating of the upstream face of the heat exchanger, at a relatively high calorific power, which might cause a safety problem, and, secondly, there would be cooling of the upstream face of the catalytic combustion wall, at a relatively low calorific power, which might inhibit the catalytic reaction.

In practice, such a heat exchanger makes it possible to effectively increase the temperature of the mixture to be burnt, from the upstream face (where said mixture is at a temperature close to room temperature) to the downstream face (where said mixture is at a temperature close to that of the catalytic combustion wall) of said heat exchanger. This rise in temperature is at least 500° C., and preferably between 500 and 1000° C.

In practice, the refractory material used for the heat exchanger must ensure, throughout its mass, that there is a certain level of conduction of the heat radiatively absorbed by the downstream face of said exchanger. However, this conduction must remain limited so as not to raise the mixture to be burnt to the ignition temperature before it reaches the catalytic combustion wall. Advantageously, the material of which the heat exchanger is made is a ceramic, for example cordierite. The thickness of the heat exchanger, that is to say its dimension in the direction in which the mixture to be burnt passes or flows is at least 5 cm.

The pressure drop caused by the mixture to be burnt passing through the heat exchanger must not be too great. In general, it is of the same order as that caused by the mixture to be burnt passing through the catalytic combustion wall, for example about 0.60 Pa.

According to the present invention, a functional gap, devoid of any material, between the heat exchanger and the catalytic combustion wall is more specifically between the downstream face of the heat exchanger and the upstream face of the catalytic combustion wall. Preferably, this functional gap is at most 5 mm, and is between 4 and 6 mm, so as to place the downstream face of the heat exchanger in direct view of the upstream face of the combustion wall and in the zone of maximum radiation of the latter.

Consequently, a heat exchanger according to the present invention should not be confused with a diffuser or heat shield, on the one hand because such a diffuser or heat shield may exist according to the present invention, in addition to and upstream of the heat exchanger, and, on the other hand, because in general a diffuser or heat shield, which is often relatively thin, plays practically no role in transferring heat toward the gas or the gas mixture which passes through it.

In addition, by virtue of the invention the thermal energy of the combustion not radiated by the downstream face of the catalytic combustion wall is largely stopped by the heat exchanger and returned toward the catalytic combustion wall, via the mixture to be burnt, serving as a heat-transfer medium. Thus, this arrangement avoids dissipating, toward the upstream part of the device with respect to the direction of flow of the mixture to be burnt, a major part of the heat not radiated to the outside of the same device.

Preferably, the combustion chamber includes a complementary thermal insulation wall placed upstream of and facing the upstream face of the heat exchanger, this thermal insulation wall, also made of refractory material, also being permeable through its thickness and suitable for passage of the mixture to be burnt.

This arrangement increases the relative thermal insulation between, on one side, the catalytic combustion wall and, on the other side, the upstream part of the device, thereby avoiding or limiting the phenomenon of catching fire in the upstream chamber through which the mixture to be burnt flows.

Preferably, the combustion chamber includes a chamber for distributing the mixture to be burnt, upstream of the so-called upstream chamber, as previously in the direction of flow of the mixture to be burnt. This distribution chamber is separated from the upstream chamber by a partition in which a multiplicity of expansion passages for the mixture to be burnt are distributed.

This arrangement makes it possible, in particular, to obtain stoichiometric oxidation or combustion, over almost the entire surface area of the downstream face of the catalytic combustion wall, whatever the size of the latter.

BRIEF DESCRIPTION OF THE DRAWING

The present invention will now be described with reference to the appended drawing, in which.

DETAILED DESCRIPTION OF THE DRAWINGS

Figure 1:
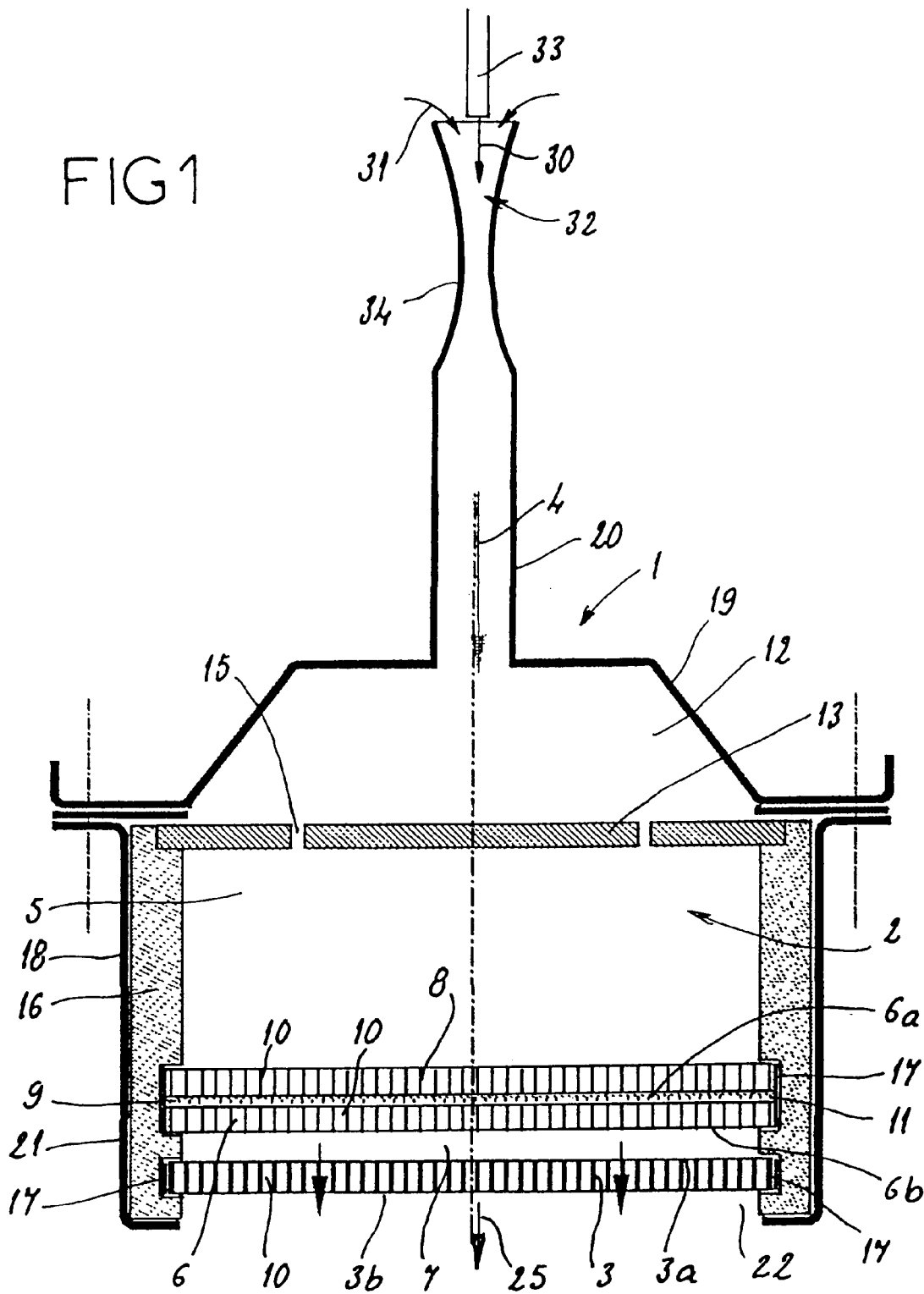
FIG. 1 shows schematically, a device according to the present invention in a first embodiment.

According to FIG. 1, a device 1 for the surface emission of infrared radiation comprises essentially a catalytic chamber 2, a means 32 for forming or obtaining the mixture to be burnt, and a casing 21 in which the chamber 2 is at least partly placed.

The chamber 2 is organized and constructed around three walls, 3, 6 and 8, which may or may not be identical, having for example a rectangular shape and being made of refractory material, permeable through their thickness, and each suitable for the mixture 4 to be burnt to pass through their entire working cross section from their upstream face to their downstream face, in the direction of flow of said mixture to be burnt. These three walls 3, 6 and 8 each consist of a disk of refractory ceramic material, for example cordierite, through which a multiplicity of parallel channels 10 pass from its upstream face to its downstream face, again in the direction of flow of the mixture to be burnt; by way of example, this may be a disk made of material of the "honeycomb" type as sold by various manufacturers, such as Corning under the name CELCOR® and used, for example, in the exhaust-gas catalytic converters of internal combustion engines.

These walls are, in succession from the upstream to the downstream end with respect to the direction of flow of the mixture 4 to be burnt:

a wall 3 for the catalytic combustion of the mixture 4 to be burnt, the internal developed surface of which is coated with a catalytic combustion material, for example a coating of a mixture of platinum and palladium, on the refractory material of said catalytic combustion wall 3 with or without an intermediate layer or washcoat of another mineral material with a high developed surface area, for example alumina;

a wall constituting by itself a heat exchanger 6, placed upstream of and facing the catalytic combustion wall 3; and a thermal insulation wall 8 placed at some distance from, upstream of and facing the heat exchange wall 6.

These three walls, 3, 6 and 8, superposed and aligned along the axis 4 of the device, are mounted transversely with respect to said chamber 2 and precisely with respect to its refractory and insulating, inner lining 16 via a seal 17 between the peripheral edge of each wall or disk 3, 6 or 8 and said lining 16.

The means 32 for forming or obtaining the mixture 4 to be burnt conventionally comprises, by way of example:

an injector 33 for injecting a pressurized combustible gas allowing a jet 30 of said combustible gas to be obtained;

a venturi-type member 34 allowing the atmospheric air 31 to be mixed with the jet 30 of combustible gas in order to obtain the mixture 4 to be burnt, which is conveyed by a pipe 20 into the distribution chamber 12 described below.

The chamber 2 is placed, at least partly, if not completely, in a casing 21, providing at least one window 22 facing the downstream face 3b of the catalytic combustion wall 3, through which the infrared radiation is emitted from the downstream face 3b of the wall 3.

The casing 21 comprises a body 18 enclosed by a cover 19 mounted so as to face a partition 13, parallel to the walls 6, 8 and 10, which are themselves mutually parallel. A multiplicity of passages 15 for expansion of the mixture 4 to be burnt are arranged in this partition 13 which separates, on one side, that is to say on the upstream side, a distribution chamber 12 for the mixture 4 to be burnt from, on the other side, that is to say on the downstream side, a so-called upstream chamber 5, i.e. upstream with respect to the catalytic combustion wall 3, again in the direction of flow of the mixture 4 to be burnt.

The upstream chamber 5 is supplied, on one side, from the expansion partition 13 with the mixture to be burnt and is closed on the other side by the catalytic combustion wall 3.

The wall 6 itself constitutes a heat exchanger according to the invention, having all the technical characteristics explained above in the preamble of the present description.

The heat exchanger 6, placed upstream of and facing the catalytic combustion wall 3, receives, in operation, via its downstream face 6b at least most of the heat radiated by the upstream face 3a of the catalytic combustion wall 3 through which the mixture to be burnt flows and within which the catalytic combustion of said mixture takes place. This heat exchanger 6 is placed only in the upstream chamber 5 and defines, with the catalytic combustion wall 3, an intermediate gap 7 separated from the rest of the upstream chamber 5 by said heat exchanger 6.

The thermal insulation wall 8 is placed upstream of and facing the heat exchanger 6, again transversely, in the upstream chamber 5 in order to define, with the exchanger 6, an intermediate gap 9 separated from the rest of the upstream chamber 5 by this thermal insulation wall 8. A diffuser 11 for diffusing the mixture 4 to be burnt, is placed transversely in the intermediate gap 9. This diffuser comprises a sheet permeable to the mixture to be burnt, made of refractory material, for example ceramic paper or foam.

The thermal insulation wall 8 and the diffuser 11 may be one and the same component, for example a wall made of ceramic foam, which wall 8 may or may not be attached to the upstream face of the heat exchanger 6.

As shown in FIG. 1, the downstream face of the heat exchanger 6 has almost the same surface area as the radiating upstream face 3b of the catalytic combustion wall 3, that is to say the working surface area of the latter.

The wall 6 constituting the heat exchanger has, where appropriate, a thickness greater than that of the walls 3 and 8, depending on the desired degree to which the mixture to be burnt is heated before its catalytic combustion or oxidation.

According to FIGS 2. and 3, the device 1 for the surface emission of infrared radiation is distinguished from the device described with reference to FIG 1. in that a transparent ceramic pane 23 closes, in a sealed manner, the window 22 of the casing 21 facing the downstream face 3b of the catalytic combustion wall 3. This casing 21, with its window closed by the pane 23, provides, together with the chamber 2, a circuit 24 by means of which the burnt gases leaving via the downstream face 3b of the catalytic combustion wall 3 are exhausted.

Figure 2:
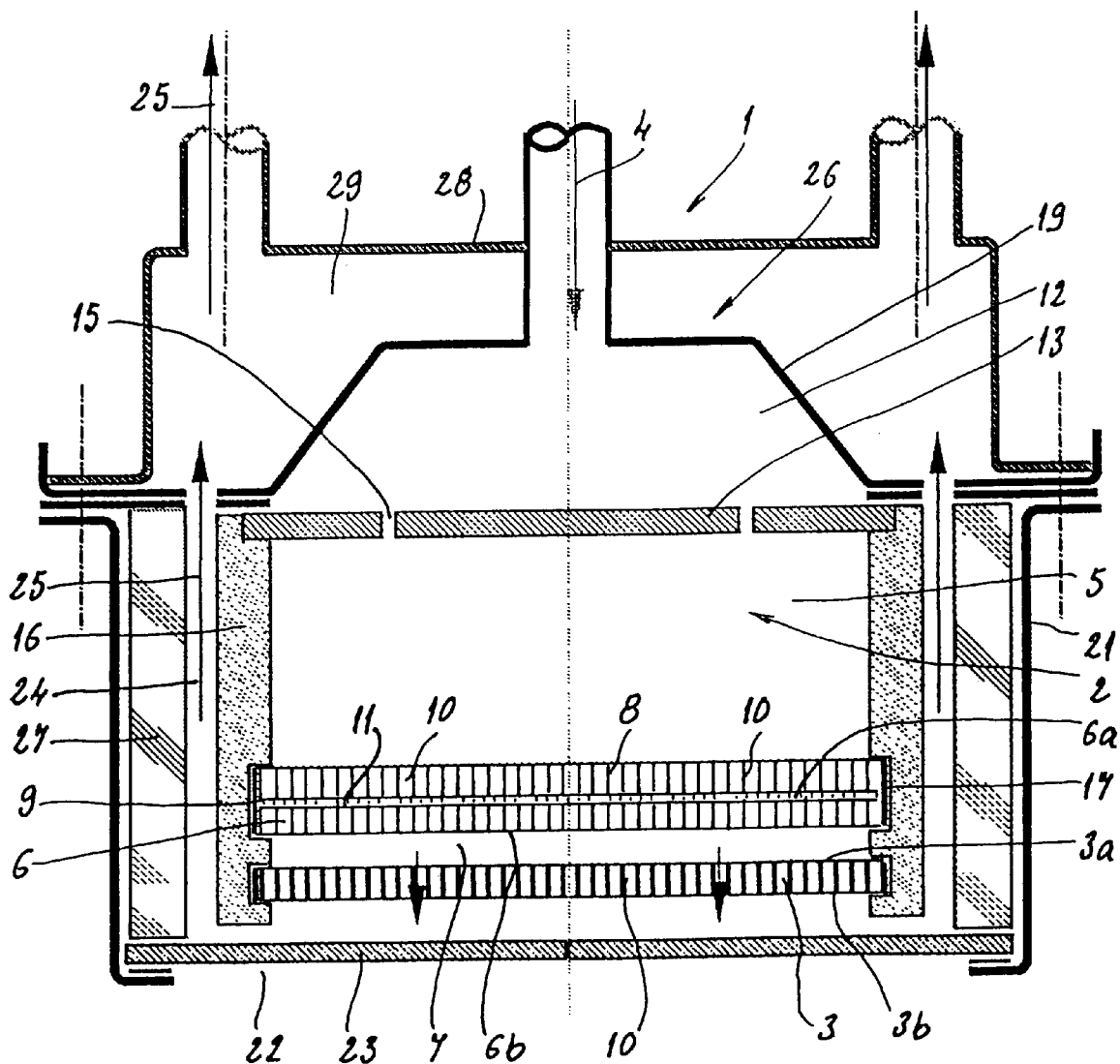
FIGS. 2 and 3 show respectively two other embodiments of the present invention, again schematically.

According to the embodiment in FIG. 2, the casing 21 includes an outer jacket 27, made of insulating and refractory material, providing with the lining 16 of the chamber 2 an annular gap in which the burnt gases 25 flow as a counter current to the flow of the mixture 4 to be burnt.

A case 28 is superposed on the casing 21, providing a chamber 29 for collecting the burnt gases 25, this being spaced away from the cover 19. In this collection chamber 29, the burnt gases 25 exchange their heat with the mixture 4 to be burnt introduced into the distribution chamber 12.

Figure 3:
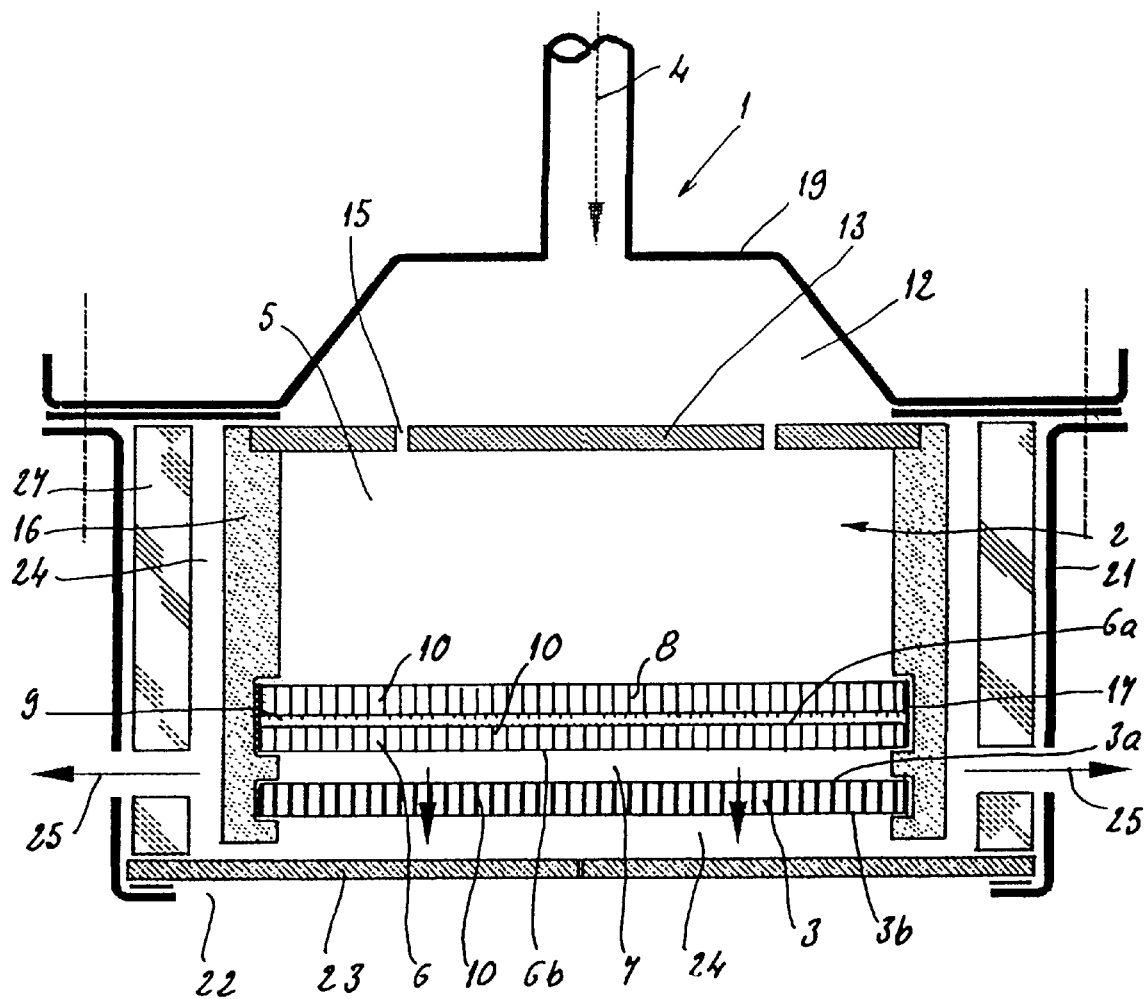

According to the embodiment in FIG. 3, and differing from that in FIG. 2, there is no longer any heat exchange between the burnt gases 25 and the mixture 4 to be burnt.

The circuit 24 via which the burnt gases are exhausted is designed to exhaust the latter transversely with respect to the direction of flow of the mixture 4 to be burnt, through a passage in the refractory jacket 27, communicating on one side with the annular gap 24, between the lining 16 and the jacket 27, and the outside.

In order to demonstrate the effectiveness of a device according to the invention compared to a conventional device, two series of comparative trials were performed between, on the one hand, a device according to FIG. 1, without a heat exchanger 6, and, on the other hand, the same device with a heat exchanger 6.

In both cases, the dimensions used and the experimental conditions are as follows.

The heat exchange wall 6, the catalytic combustion wall 3 and the thermal insulation wall are each obtained by cutting a disk from a monolithic element of the "honeycomb" type made of cordierite, as sold by Corning under the brand name CELCOR®. The working cross section of each disk is 225 cm$^2$ and corresponds to 14,000 cells, each having an individual cross section of 1 mm$^2$.

The diffuser 11 consists of a disk of ceramic foam having a thickness of 13 mm.

The heat exchanger 6 (the heat exchange wall) has a thickness of 50 mm and allows the mixture to be burnt to have a residence time within it of 0.16 seconds.

The air (oxidizer gas) flow rate is varied depending on the flow rate of the combustible gas, which is itself modulated in order to control the calorific power emitted. Once the air is at 20° C., the air flow rate is varied and is between 10 and 16 m$^3$/h.

The catalytic reaction is initiated by a naked flame, obtained by creating a spark between two electrodes, in the 5 mm gap between the walls 6 and 3, using a stoichiometric mixture to be burnt.

The temperatures are continuously recorded, especially on the upstream and downstream faces of the diffuser 11, and those of the exchanger 6.

The combustion fumes are continuously analyzed with regard to their methane, carbon monoxide, oxygen and carbon dioxide content.

The flow rate of combustible gas is modulated, by varying its pressure, within the following setting range:

a pressure of 50 mbar (500 Pa), corresponding to a minimum surface power of 60 kW/m$^2$;

a pressure of 140 mbar (1400 Pa), corresponding to a maximum surface power of 100 kW/m$^2$.

For a minimum surface power (60 kW/m$^2$), the operation without a heat exchanger 6 is not possible with a forced-air flow rate of 14 m$^3$/h. This is because the mixture to be burnt is not hot enough to maintain a minimum temperature sufficient for all the combustible gas to be catalytically oxidized. This results in a gradual and ineluctable deactivation of the catalytic material (an increasing amount of $CH_4$ and a decreasing amount of $CO_2$ being measured in the fumes).

If the calorific power of the mixture to be burnt is increased, corresponding to a surface power of 75 kW/m$^2$, and the air flow rate reduced (to 10 m$^3$/h), then the operation of the device becomes possible again: the temperatures measured on the upstream face of the wall 3 are about 650° C. and those on the downstream face of the diffuser 11 about 780° C. However, under these new conditions, for a maximum power, the temperatures measured at the rear of the wall 3 are close to 900° C. and those measured on the downstream face of the diffuser 11 are about 1000° C. After a few minutes, the insulating properties of the diffuser 11 made of ceramic foam are destroyed. Thus, the upstream face of the diffuser 11 reaches temperatures close to those of the downstream face. This creates a fire in the chamber 2. A complementary trial with an air flow rate greater than 10 m$^3$/h did not prevent the fire.

The same series of trials was carried out on the same device, but provided in addition with the heat exchanger 6, as defined above, between the diffuser 11 and the wall 6. The exchanger 6 is placed so as not to modify the intermediate gap 7. Within the range bounded by the minimum and maximum levels of surface power, the operation of the device is possible with an air flow rate of 14 m$^3$/h. The values of the temperatures recorded are given in the table below. The temperatures at the wall 3 are sufficient to maintain complete catalytic activity. The upstream face of the diffuser 11 is maintained constantly at a low temperature level, guaranteeing that the assembly operates properly. At this stage, the heat exchange is very important since it makes it possible to increase the temperature of the flow of the mixture to be burnt from 750° C. at minimum power and from 950° C. at maximum power. In addition, the temperatures measured at various points on the downstream surface of the catalytic wall 3 proved to be almost identical, thus guaranteeing that the emission of the infrared radiation is properly distributed over the entire emission surface. A complementary trial in which the temperature of the supply air was raised to 200° C. did not modify the behavior of the apparatus within the operating range studied.

|  | Upstream face wall 3 | Upstream face exchanger 6 | Downstream face exchanger 6 | Upstream face diffuser 11 |
| --- | --- | --- | --- | --- |
| Minimum power | 650° C. | 800° C. | 45° C. | 32° C. |
| Maximum power | 905° C. | 1030° C. | 51° C. | 34° C. |

What is claimed is:

1. A device for a surface emission of infrared radiation, by combustion of a gaseous mixture comprising a combustible component and an oxidizer gas to create heat, said device comprising:

a catalytic combustion wall made of refractory material which is permeable through a thickness of the catalytic combustion wall and with at least an internal developed surface coated with a catalytic combustion material wherein the catalytic combustion wall is arranged for passage of the gaseous mixture to be burnt from an upstream face to a downstream face;

a heat exchanger made of refractory material which is permeable through a thickness of the heat exchanger and arranged for passage of the gaseous mixture to be burnt, wherein the heat exchanger is located upstream of the catalytic combustion wall, and disposed with respect to said catalytic combustion wall to form therebetween a first intermediate functional gap, said heat exchanger being also arranged so as to receive via the downstream face of the heat exchanger at least most of the heat radiated by the upstream face of said catalytic combustion wall, and to deliver at least part of said received heat to said gaseous mixture, passing through said heat exchanger and a length of the heat exchanger in a direction of flow of said gaseous mixture to be burnt, is dimensioned so that said gaseous mixture resides in said heat exchanger for at least 0.1 s; and a diffusing wall placed upstream of and in contact with the heat exchanger, the diffusing wall, made of refractory material, also being permeable through a thickness and suitable for passage of the gaseous mixture to be burnt.

2. The device as claimed in claim 1, wherein said combustion chamber includes a thermal insulation wall placed upstream of and facing the heat exchanger, said thermal insulation wall, made of refractory material, also being permeable through a thickness of the thermal insulation wall and suitable for passage of the gaseous mixture to be burnt.

3. The device as claimed in claim 2, wherein the thermal insulation wall is placed transversely in the upstream chamber and with the heat exchanger to form a second intermediate gap.

4. The device as claimed in claim 3, wherein the diffuser for the mixture to be burnt is placed transversely in the second intermediate gap.

5. The device as claimed in claim 4, wherein the diffuser comprises a sheet permeable to the mixture to be burnt, made of refractory material.

6. The device as claimed in claim 2, wherein the thermal insulation wall consists of a disk of refractory ceramic material, through which a multiplicity of parallel channels pass from an upstream face to a downstream face of the thermal insulation wall, in the direction of flow of the mixture to be burnt.

7. The device as claimed in claim 1, wherein the catalytic combustion wall consists of a disk of refractory ceramic material, through which a multiplicity of parallel channels pass from the upstream face to the downstream face of the catalytic combustion wall, in the direction of flow of the gaseous mixture to be burnt.

8. The device as claimed in claim 1, wherein the heat exchanger consists of a disk of refractory ceramic material, through which a multiplicity of parallel channels pass from the upstream face to the downstream face of the heat exchanger, in the direction of flow of the mixture to be burnt.

9. The device as claimed in claim 1, wherein the downstream face of the heat exchanger has almost the same surface area as the downstream face of the catalytic combustion wall.

10. The device as claimed in claim 1, wherein the combustion chamber includes a chamber for distributing the mixture to be burnt, upstream of an upstream chamber, in the direction of flow of the mixture to be burnt, separated from the upstream chamber by a partition in which a multiplicity of passages for expansion of the mixture to be burnt are distributed.

11. The device according to claim 1, wherein the length of said functional gap in the direction of flow of said mixture to be burnt, is arranged so that the downstream face is in direct reach of the radiations emitted by the upstream face of the catalytic combustion wall.

12. A device for a surface emission of infrared radiation, by combustion of a gaseous mixture comprising a combustible component and an oxidizer gas to create heat, said device comprising:

a catalytic combustion wall made of refractory material which is permeable through a thickness of the catalytic combustion wall and with at least an internal developed surface coated with a catalytic combustion material wherein the catalytic combustion wall is arranged for passage of the gaseous mixture to be burnt from an upstream face to a downstream face;

a heat exchanger made of refractory material which is permeable through a thickness of the heat exchanger and arranged for passage of the gaseous mixture to be burnt, wherein the heat exchanger is located upstream of the catalytic combustion wall, and disposed with respect to said catalytic combustion wall to form therebetween a first intermediate functional gap, said heat exchanger being also arranged so as to receive via the downstream face of the heat exchanger at least most of the heat radiated by the upstream face of said catalytic combustion wall, and to deliver at least part of said received heat to said gaseous mixture, passing through said heat exchanger and a length of the heat exchanger is at least 5 cm; and a diffusing wall placed upstream of and in contact with the heat exchanger, the diffusing wall, made of refractory material, also being permeable through a thickness and suitable for passage of the gaseous mixture to be burnt.

13. The device according to claim 12, wherein the heat exchanger is arranged to increase the temperature of the gaseous mixture to be burnt up to a value below the ignition temperature of said gaseous mixture.

14. A device for a surface emission of infrared radiation, by combustion of a gaseous mixture comprising a combustible component and an oxidizer gas to create heat, said device comprising:

a catalytic combustion wall made of refractory material which is permeable through a thickness of the catalytic combustion wall and with at least an internal developed surface coated with a catalytic combustion material wherein the catalytic combustion wall is arranged for passage of the gaseous mixture to be burnt from an upstream face to a downstream face;

a heat exchanger made of refractory material which is permeable through a thickness of the heat exchanger and arranged for passage of the gaseous mixture to be burnt, wherein the heat exchanger is located upstream of the catalytic combustion wall, and disposed with respect to said catalytic combustion wall to form therebetween a first intermediate functional gap, said heat exchanger being also arranged so as to receive via the downstream face of the heat exchanger at least most of the heat radiated by the upstream face of said catalytic combustion wall, and to deliver at least part of said received heat to said gaseous mixture, passing through said heat exchanger and the heat exchanger is arranged to increase a temperature of the gaseous mixture to be burnt, from the upstream face to the downstream face of said heat exchanger, by an amount of at least 500° C.; and a diffusing wall placed upstream of and in contact with the heat exchanger, the diffusing wall, made of refractory material, also being permeable through a thickness and suitable for passage of the gaseous mixture to be burnt.

15. A device for a surface emission of infrared radiation, by combustion of a gaseous mixture comprising a combustible component and an oxidizer gas to create heat, said device comprising:

a catalytic combustion wall made of refractory material which is permeable through a thickness of the catalytic combustion wall and with at least an internal developed surface coated with a catalytic combustion material wherein the catalytic combustion wall is arranged for passage of the gaseous mixture to be burnt from an upstream face to a downstream face;

a heat exchanger made of refractory material which is permeable through a thickness of the heat exchanger and arranged for passage of the gaseous mixture to be burnt, wherein the heat exchanger is located upstream of the catalytic combustion wall, and disposed with respect to said catalytic combustion wall to form therebetween a first intermediate functional gap, said heat exchanger being also arranged so as to receive via the downstream face of the heat exchanger at least most of the heat radiated by the upstream face of said catalytic combustion wall, and to deliver at least part of said received heat to said gaseous mixture, passing through said heat exchanger and a temperature of said gaseous mixture is increased within said heat exchanger by an amount comprised between 500 and 1000° C.; and a diffusing wall placed upstream of and in contact with the heat exchanger, the diffusing wall, made of refractory material, also being permeable through a thickness and suitable for passage of the gaseous mixture to be burnt.

* * * * *